United States Patent [19]
Quaglia

[11] Patent Number: 5,229,885
[45] Date of Patent: Jul. 20, 1993

[54] INFINITELY VARIABLE FOCAL POWER LENS UNITS PRECISELY MATCHED TO VARYING DISTANCES BY RADAR AND ELECTRONICS

[76] Inventor: Lawrence D. Quaglia, 917 Quincy Ave., Bronx, N.Y. 10465

[21] Appl. No.: 754,058

[22] Filed: Sep. 3, 1991

[51] Int. Cl.$^5$ .............................................. G02B 3/12
[52] U.S. Cl. ................................... 359/665; 359/666; 351/41; 351/158; 351/159
[58] Field of Search ................... 351/159, 158, 41; 359/665, 666, 667

[56] References Cited

U.S. PATENT DOCUMENTS

| | | | |
|---|---|---|---|
| 1,515,389 | 11/1924 | Hopkins | 351/44 |
| 3,598,479 | 8/1971 | Wright | 351/159 |
| 3,614,215 | 10/1971 | Mackta | 351/159 X |
| 4,181,408 | 1/1980 | Sanders | 351/159 |
| 4,261,655 | 4/1981 | Honigsbaum | 351/41 |
| 4,403,840 | 9/1983 | Okum | 351/41 |
| 4,418,990 | 12/1983 | Gerber | 351/41 |
| 4,477,158 | 10/1984 | Pollock et al. | 351/169 |
| 4,756,605 | 7/1988 | Okada et al. | 351/158 X |
| 4,890,903 | 1/1990 | Treisman et al. | 350/419 |
| 4,913,536 | 4/1990 | Barnea | 350/419 |
| 4,932,762 | 6/1990 | Robb | 359/665 |
| 4,989,958 | 2/1991 | Hamada et al. | 350/419 |

FOREIGN PATENT DOCUMENTS

| | | |
|---|---|---|
| 55-36857 | 3/1980 | Japan . |
| 258325 | 9/1926 | United Kingdom . |

Primary Examiner—Joseph E. Clawson, Jr.
Assistant Examiner—Do Hyum Yoo
Attorney, Agent, or Firm—Lawrence D. Quaglia

[57] ABSTRACT

An automatic fast focusing infinitely variable focal power Lens Unit, to supply the infinitely variable focal power as required. The Lens Unit consists of two lenses, one of which is stationary, being connected to an eyeglass frame or other optical products with the outer lens moving in connection with precisely constructed joints fastened to the inner stationery lens. The outer lens is automatically adjusted by Precision Proportional Solenoids. A Radar-sending and receiving unit supplies the signal for controlling the movement of the outer lens, that takes place to supply the infinitely variable focal power. The Lens Unit is covered around on the periphery by a C-shaped Ring reservoir containing a clear refractive liquid to flow throughout the entire Lens Unit as the outer lens moves outwardly and then back inward to its starting point and zero mark, for value of focal power. The construction described herein is to give precision and uniform results repeatedly, for people who need bifocals, trifocals, etc., and for people who need glasses to read because of farsightedness due to age, etc. The eyeglass product described in this invention is designed to help the visually impaired as well as those who need reading glasses to give the best obtainable results possible. The Lens Units are also readily adapted to sighting scopes, bombsights, etc. either for civilian or military use.

29 Claims, 6 Drawing Sheets

INFINITELY VARIABLE FOCAL POWER LENS UNITS PRECISELY MATCHED TO VARYING DISTANCES BY RADAR AND ELECTRONICS

FIELD OF INVENTION

This invention provides for Variable focal power lens adjustment automatically as the eyes are focused straight ahead on an object or at distant points. It also gives repetitive performance on a daily basis over varying temperatures. The Lens Units are fast-acting and the precision components provide for standardization in replacement of assemblies.

BACKGROUND OF THE INVENTION

This patent is dedicated to the memory of Rose Quaglia, for her support and encouragement.

There have been various variable focal power Lens Units using a clear liquid between lenses to try to vary the focal power. Examples of such variable focal power lenses are those disclosed in U.S. Pat. Nos. 4,989,958 to Hamada et al. dated Feb. 5, 1991; 4,890,903 to Treisman et al., dated Jan. 2, 1990; 4,477,158 to Pollock et al. dated Oct. 16, 1984; 4,261,655 to Honigsbaum dated Apr. 14, 1981; 4,181,408 to Senders dated Jan. 5, 1980; 258,325 to Mitchell dated Sep. 15, 1926; 1,515,389 to Hopkins dated Nov. 11, 1924.

U.S. Pat. No. 4,913,536 to Barnea dated Apr. 3, 1990, discloses two lenses separated with a grommet, one of which is flexible having focal power varied by pumping in or pumping out fluid with the flexible lens deforming giving that variable focal power. They have many variables in their operation and at best give questionable performance. Review of the previous art enclosed will reveal this. Another lens device is a product called Varilux. This product uses a tapered lens.

In use the human eye goes from bottom to top to focus on objects of various distances. This is the basis for bifocals, trifocals, etc. The present invention is far superior in that the eye does not have to be in a certain limited position for operation. The eye does not have to wait for the fluid to be pumped in, which takes time. The present invention is fast-acting, keeping up with the eyes. The eyeglasses of the present invention fit the normal function of the eyes, as compared to past inventions where the individual's eyes have to adjust to the eyeglasses' principals for passable operation. A pair of the present invention eyeglasses are to replace multiple pairs of eyeglasses for most people wearing bifocals, etc. For an individual needing eyeglasses, one set of the present invention eyeglasses can be used for present and for future use, with minor adjustment by an optometrist if eye condition should change. The lenses will automatically focus for the object distance instantaneously, due to the electronic components, before the eyes are aware of the change in distance of objects. The present invention consisting of the manually adjustable model for eye measurement can be used with sighting devices to increase their value on weapons systems, e.g. bomb sights, artillery sighting lenses, etc. This benefit can be realized after the target is sighted in, then the Variable Focal Point Lens Unit is connected so that anyone with a vision problem can focus in on the target without losing range for accuracy. The Lens Units can also be applied to gas masks for vision correction as well as to telescopic scopes.

SUMMARY

The present invention offers improvement over prior art. The Lens Units are designed to better and different operating principles along with precision and standardization of performance between the eyeglasses and the Lens Units for other variable focal power products.

The present invention will supply an infinitely variable focal power lens unit to match the focusing of the human eye. The negative focal power Lens Units mentioned and described in the embodiment section can be used for individuals that are nearsighted. As described in the embodiment section, the positive focal power Lens Units are for individuals requiring focal power adjustment for farsightedness due to age, so they can properly read, etc. This invention will supply uniform results for Lens Units. These Lens Units are standardized in design and performance which is not true for the prior art. The Lens Units of the present invention are precision units actuated by precision movement of proportional solenoids with matched precision movement. The solenoids are controlled by output of a precision Current controlled power supply. An Electronic Converter actuates and controls the power supply. The Electronic Converter is precisely controlled by a Radar sending and receiving unit. The prior art in no way can match the performance of this invention. This invention will provide a much needed benefit for people who wear bifocals, trifocals, etc. There is also a benefit for a military sighting devices, bomb sights, sighting scopes, etc.

BRIEF DESCRIPTION OF DRAWINGS

A Numerical Index

For FIGS. 1-14, 1 and 2 are lenses, 3 is the liquid, 4 is the hinge pivot, 5 is the C-shaped Ring reservoir, 6 and 7 are lens outer surfaces, 8 and 9 are lens inner surfaces, 10 is outer surface of ring 5, 11 is reservoir for fluid 3, 12 is inner surface of 5 for reservoir, 13 and 14 are connection points for 1 and 5, 2 and 5, 15 is sealing plug for 5. No. 16 is sliding joint, 17 is sliding joint contact surface. No. 18 are channels, 19 is radius stabilizer ring. No. 51 is pivot connection fastened to Lens 1. No. 55 is mounting flange. No. 68 is internal power wire harness to the Hollow Proportional Solenoids 35 and 36. No. 70 is connection point for power, from power supply 37 to 68, to activate the Hollow Proportional Solenoids 35 and 36 respectively for Lens Units 31 and 32 respectively. Nos. 71 and 72 are fluid ports, 73 are rear ends and 74 are plunger ends of Hollow Proportional Solenoids 35 and 36 in FIGS. 13 and 14. Positive focal power consists of having outer side of lens radius away from eye smaller than the inner side of the lens radius near the eye. Negative focal power has outer radius of the lens larger and inner radius of the lens smaller.

FIG. 6 shows the Lens Unit of FIG. 5 closed supplying positive focal power due to the difference in radii by special design of the lenses 1 and 2 and liquid in between.

DESCRIPTION OF EMBODIMENT

This invention is designed to supply variable positive focal power for farsightedness and variable negative focal power for nearsightedness. The invention is also designed to replace bifocals, trifocals, etc., with its variable focal power varying proportionally to the distance of objects as they are viewed by the individual wearing a pair of the auto focusing eyeglasses automatically. The difference in radii of the inner and outer Lens Unit surfaces determine the amount of focal power.

This invention uses two clear lenses with a variable mass in between, that are covered around on periphery (sides) with a molded hollowed out thin-walled elastomeric C-shaped Ring. The periphery of the lenses can be round, octagonal, etc. The C-shaped Ring also serves as a reservoir for fluid 3. The C-shaped Ring can also be made of clear or opaque molded Surlyn or similar flexible thin material exhibiting high strength for its very thin thickness of material, with good flexibility. The lenses can be made of CR-39 plastic lens material or other rigid thin plastic or glass materials. The lenses can be compression or injection molded. The variable mass can be any of a variety of clear liquids having the same index of refraction equaling the CR-39, or approximately the same index or refraction equaling the plastic lenses either rigid or flexible. One liquid in particular is Polydimethylsiloxane Polymer (Silicone Oil) an industrial lubricant. The optical properties are excellent, with an index of refraction of approximately 1.4. The liquid will not discolor, and is not effected by sunlight. It has a flat slope as temperature vs. viscosity. This flat slope refers to the change in viscosity as temperature changes. It allows for an even flow of liquid from low to high temperatures that are found in everyday environments and weather conditions. The liquid will not freeze or evaporate under these conditions. A DC-200/five Centistokes grade will provide excellent operation. Lower grade numbers below five in Centistokes are combustible and can be used but the flashpoint is much lower, which may be acceptable in certain applications. The five grade has a 272° F. flashpoint which is safe to use as it is much higher than the temperature of boiling water. This Silicone Oil is manufactured by Dow Corning at Midland, Mich.

Figure 13:
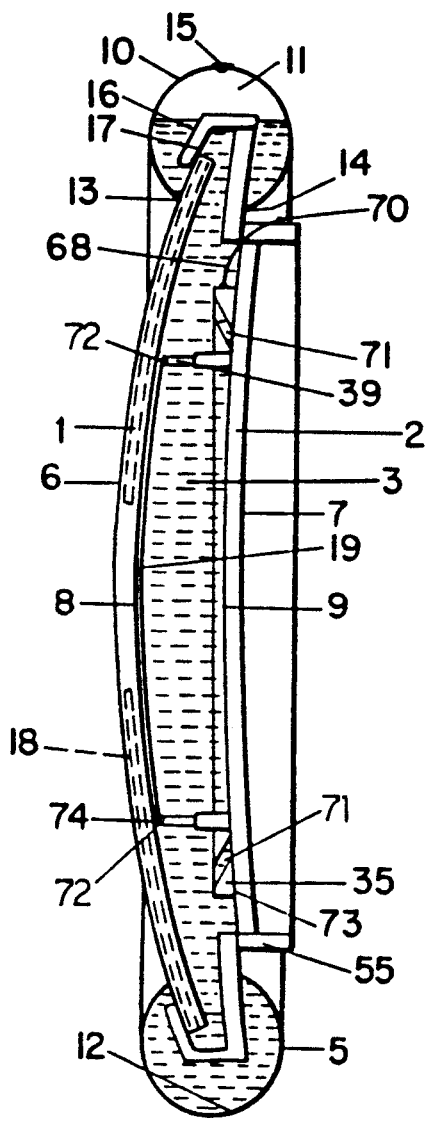
FIG. 13 shows a Lens Unit open with an internal Proportional Solenoid that has a hollow bore. This arrangement can supply both positive and negative focal power determined by function of Solenoid and by reversing the position of the lenses one of which is flexible.
Figure 14:
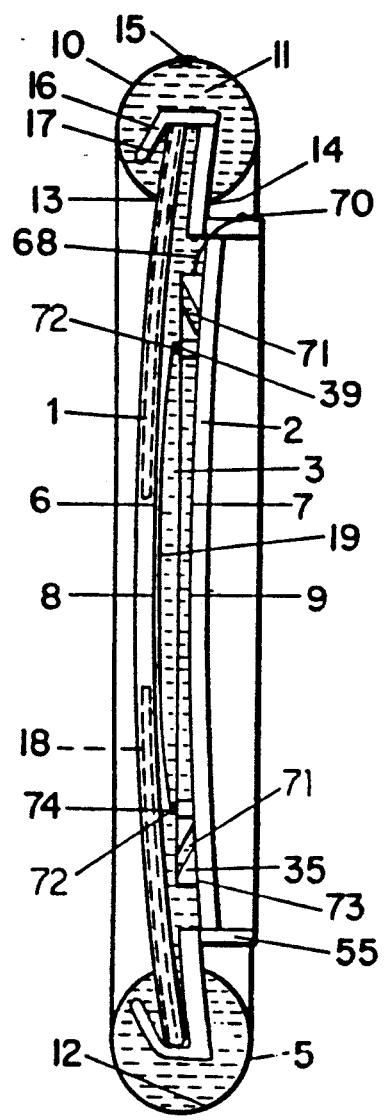
FIG. 14 shows Lens Unit of FIG. 13 closed supplying no focal power.

Current plastic lenses of Acrylic, Polycarbonate and Polystyrene are approximately 1.5 at ($^n$D) for index of refraction. The viscosity of the clear liquid should preferably be light. Medium can be used but will take longer to adjust focal power. It should not freeze at low temperatures or boil away at high temperatures or evaporate. The liquid should be of good quality, free from impurities and bubbles, etc. The C-shaped Ring reservoir containing the fluid for the lenses is preferably mounted eccentrically to the lenses, for FIGS. 1–6, and 9–12 with its center line above the center line of the lenses. The C-shaped Ring reservoir containing the fluid is securely mounted to the lenses so that there is no leakage. The C-shaped Ring reservoir covers the lenses on the outside of the lens; it can also be mounted in-between the lenses above or below the hinge pivot or sliding joint 16 as well. A coloring agent can be added to the variable mass liquid for prescription sunglasses. Each Lens Unit except FIGS. 13 and 14 consists of two lenses mounted on a frictionless pivot (hinge). This pivot between the lenses for FIGS. 1–12 establishes a starting point creating a zero mark for its focal power. In reference to FIGS. 13 and 14 the starting point and the zero mark is from the Solenoid in its closed position with the flexible lens stabilizer ring 19 connected to the plunger end 74 in its most inward position as shown in FIG. 14 and with the flexible lens being in its most inward position under the sliding joints 16. This is the same for the Solenoids in closed position as shown in FIGS. 1–12 as well. This hinge can be made of jeweled bearings and attached to the lenses by integral molding, or other industrial processes. The C-shaped Ring reservoir surrounds the lenses with the hinge pivot. As the forward lens spreads apart from the rear stationary lens, the liquid fills the void by displacement of the fluid from the reservoir by capillary attraction of fluid in between the lenses with gravity and a small amount of Helium gas pressure added to the reservoir after filling the liquid, to speed up the movement of the fluid. As Lens 1 was spreading apart from Lens 2 an infinitely varying difference in radii were created between Lenses 1 and 2. This results in a variable positive focal power for FIGS. 1, 3 and 7 to replace bifocals, trifocals, etc.

Also, the liquid should have good capillary attraction to the lenses. As the forward lens 1 spreads apart from the rear stationary lens 2 in FIGS. 1 to 14 a variable focal point lens is established giving a variable focal power for FIGS. 1, 3 and 7. When using the same index of refraction for lenses and intermediate liquid, the shape of the lens unit with its differences in radii will determine the focal power.

Figure 1:
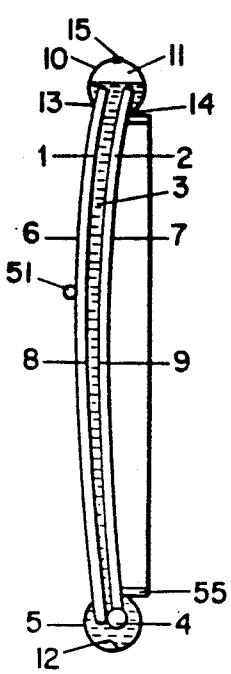
FIG. 1 shows a Lens Unit supplying positive focal power when open due to difference of the radii of inner and outer Lens Unit surfaces 6 and 7, and with a clear liquid in between the two clear lenses having the same index of refraction.
Figure 2:
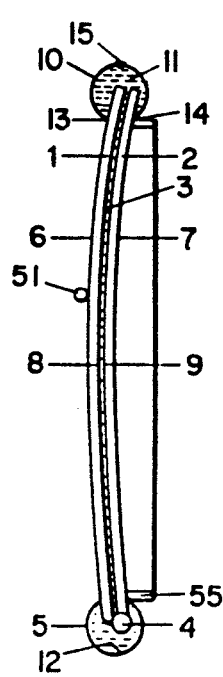
FIG. 2 shows the Lens Unit of FIG. 1 closed supplying no positive focal power, depending on design of the inner and outer radii there is a very thin amount of liquid in-between the clear lenses.
Figure 3:
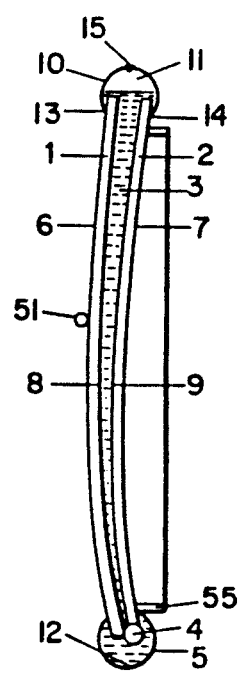
FIG. 3 shows a Lens Unit open supplying positive focal power with difference in radii of the Lens Unit enhanced by having a higher index of refraction of the liquid 3 than the lenses 1 and 2. The difference in radii of the Lens Unit is in between the lenses 1 and 2 on surfaces 8 and 9. The difference in radii can also be on the outer surfaces of lenses 1 and 2 on surfaces 6 and 7.
Figure 4:
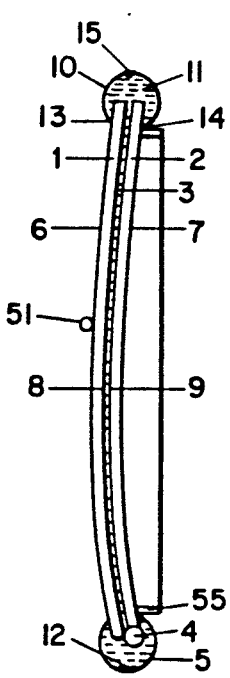
FIG. 4 shows the Lens Unit of FIG. 3 closed supplying no focal power, with a very thin amount of clear liquid in between the clear lenses. The liquid has a higher index of refraction than the clear lenses.
Figure 5:
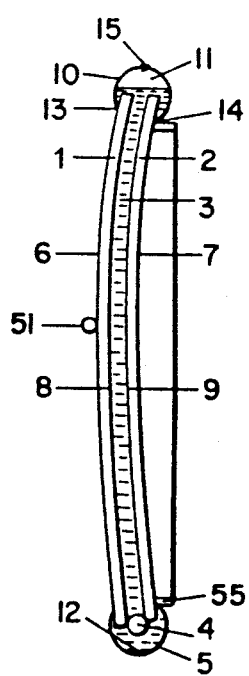
FIG. 5 shows a Lens Unit open supplying none or very little of positive focal power with equal index of refraction for lenses and liquid.
Figure 6:
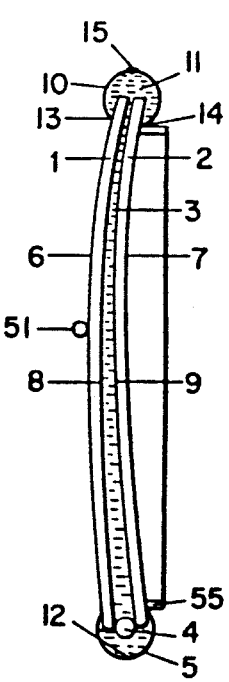
Figure 11:
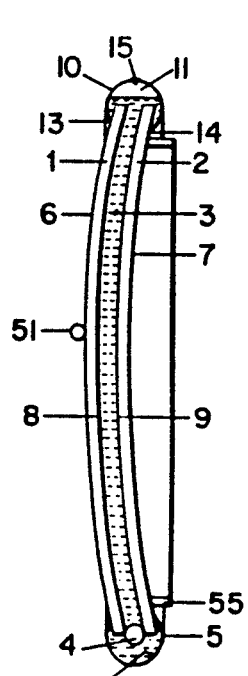
FIG. 11 shows Lens Unit closed supplying negative focal power.
Figure 12:
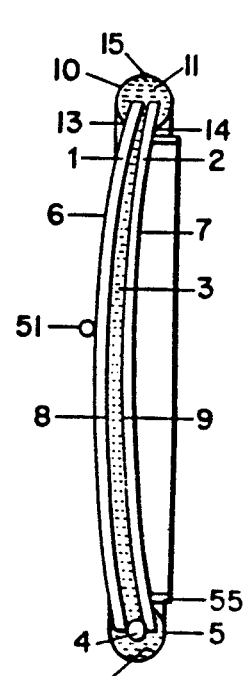
FIG. 12 shows Lens Unit of FIG. 11 open with no negative focal power.
Figure 7:
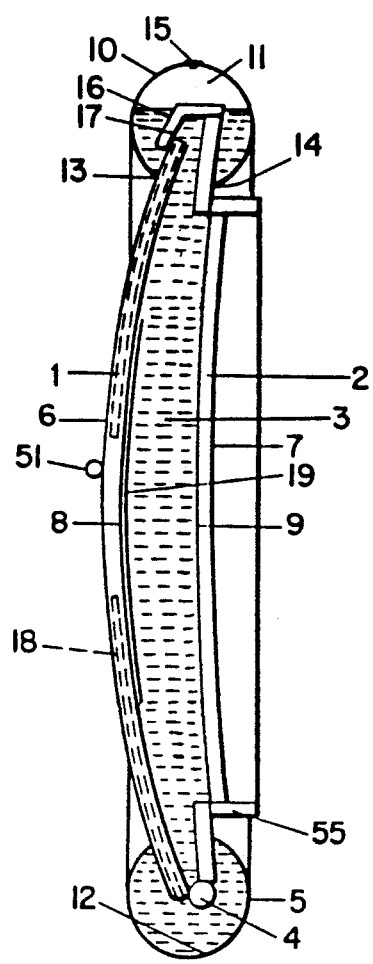
FIG. 7 shows positive focal power using flexible forward lens with Lens Unit open outwardly.
Figure 8:
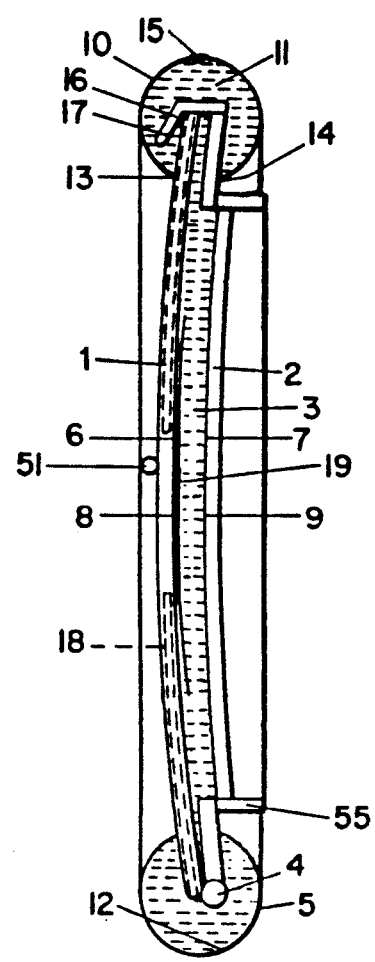
FIG. 8 shows the Lens Unit of FIG. 7 closed inward with no focal power.
Figure 9:
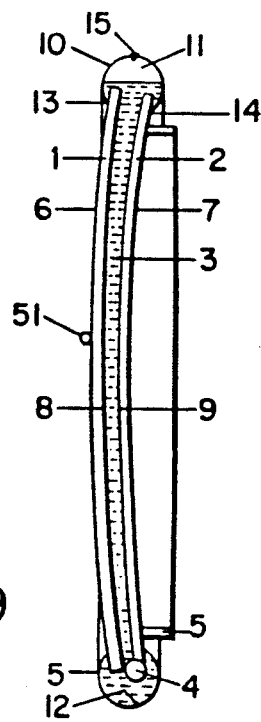
FIG. 9 shows Lens Unit for negative focal power with lens open.
Figure 10:
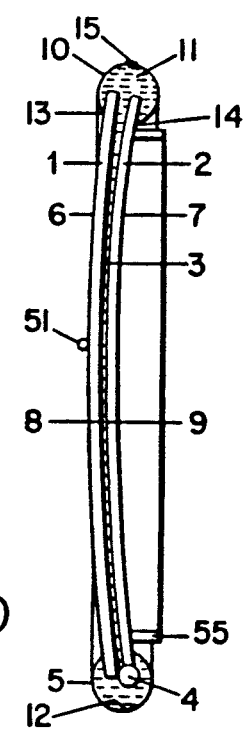
FIG. 10 shows Lens Unit of FIG. 9 closed with no negative focal power.

FIG. 1 shows this arrangement. FIG. 2 shows the lenses closed with a very thin amount of liquid in between lenses 1 and 2. FIG. 6 shows focal power when closed by slight shape change of lens 2 and by different location in relationship to hinge pivot 4. FIG. 5 shows the Lens Unit of FIG. 6 open with no focal power by arrangement of the Lenses with the liquid 3 inbetween creating parallel radii. This is an alternative arrangement so that the proportional solenoids can be used in reverse operation of design if desired. FIG. 3 shows focal power using a higher index of refraction for fluid 3 than the outer lenses 1 and 2. When lenses 1 and 2 are closed, there is a very thin amount of fluid 3 in between and the radii are parallel resulting in no focal power. The focal power in FIG. 3 is achieved by difference in radii of surfaces 8 and 9 inner surfaces of lenses 1 and 2. Shown in FIG. 7 is an alternate Lens Unit supplying positive focal power that can be constructed with Lens 1 being of flexible clear material having internal channels on surface 8 radiating out from center to provide uniform change in radii as lens 1 moves in and out, with one end of Lens 1 fastened to hinge pivot 4, and with opposite end fastened under a sliding joint 16 located 180° from hinge 4 to Lens 2. The channels provide for shrinkage of surface area 8 on Lens 1 as the lens bends, without causing crumpling or uneven movement of lens from center line axis as shown in FIGS. 7, 8, 13 and 14. The sliding joint 16 is mounted inside or outside of C-Ring reservoir 5 and is fastened to Lens 2. The Solenoid pivots 51 and 52 are connected near to the center line of Lens 1 on the inner bore of C-Ring 5 surface 6 at any point adjacent to 13 excluding the quadrant containing hinge 4, and extending out left or right respectively to form Lens Units 31 and 32 respectively with Solenoid plunger extensions 39 and 40 connected respectively to create difference in radii as Solenoids 35 and 36 expand respectively. Solenoid pivots 51 and 52 can be made of clear high strength material. FIG. 8 shows the Lens Unit of FIG. 7 closed supplying no focal power. FIG. 9 shows negative focal power using a higher index of refraction for fluid 3 than lenses 1 and 2. Difference in radii is between surfaces 8 and 9, (can also be between surfaces 6 and 7 of lenses 1 and 2) with center portion being thinner than the outer ends. FIG. 10 shows the Lens Unit of FIG. 9 closed supplying no focal power, due to parallel radii of lenses 1 and 2 for surfaces 6 and 7, or 8 and 9. FIG. 11 shows negative focal power when closed by creating a smaller radius on inner lens 2 outer surface 7, with larger radius on surface 6 of lens 1. FIG. 12 shows lens 1 open creating no focal power with parallel radii. Nos. 6 and 7 are outer lens surfaces for FIGS. 1-14. Nos. 8 and 9 are inner surfaces of lenses in FIGS. 1-14. No. 3 is the clear intermediate liquid in FIGS. 1-14. Nos. 1 and 2 are the lenses for FIGS. 1-14. No. 5 is the C-shaped Ring reservoir containing fluid for FIGS. 1-14. No. 4 is the hinge pivot for the pivoting of the forward lens No 1 for FIGS. 1-14. Nos. 13 and 14 are contacting surfaces for connection of C-shaped reservoir Ring to lens surfaces 6 and 7 for FIGS. 1-14. Leakproof connection is made by various industrial processes. After Lens Units are assembled, they are filled with clear liquid 3, then an amount of Helium gas is added under a small pressure sufficient enough to expel the air in C-Ring reservoir 5 and help the transfer of fluid 3 from C-Ring reservoir 5 to the void between inner surfaces 8 and 9 of Lenses 1 and 2 and vice versa as the Lens Units are varied. Next C-Ring reservoir 5 is capped off with plug 15 in C-Ring reservoir 5 for FIGS. 1-14. In FIGS. 1-14 there is always a small amount of liquid between the lenses. This supplies a starting reference load so that the Proportional Solenoids (FIG. 16) operate uniformly proportionately and with precision. The liquid also acts as a cushion between the lenses.

Figure 15:
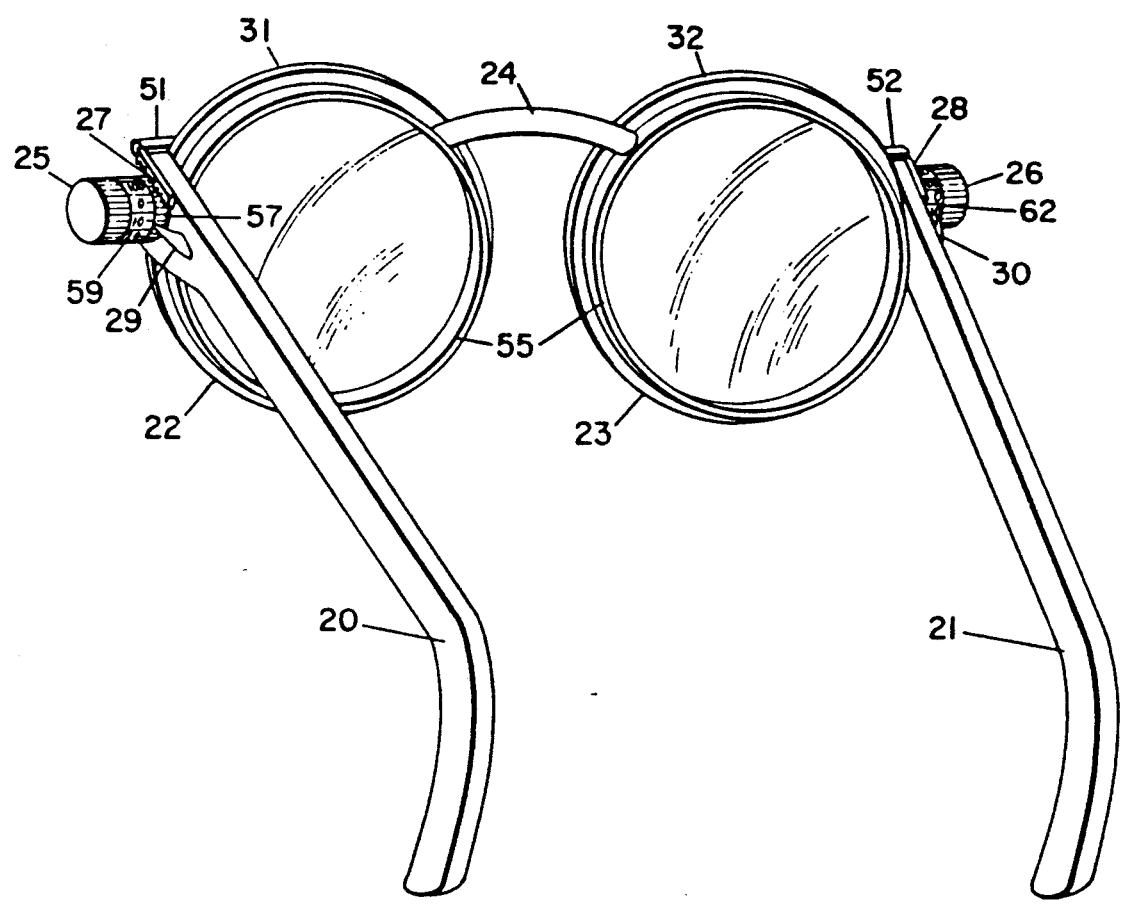
FIG. 15 shows an eyeglass frame 24 used for eye measurement prescription with manual adjustments for Lens Units 31 and 32 in frame 24. Adjustments are made by turning knobs 25 and 26 causing gear racks 27 and 28 to adjust Lens Units 31 and 32, respectively. Each adjustment is independent of each other.
Figure 16:
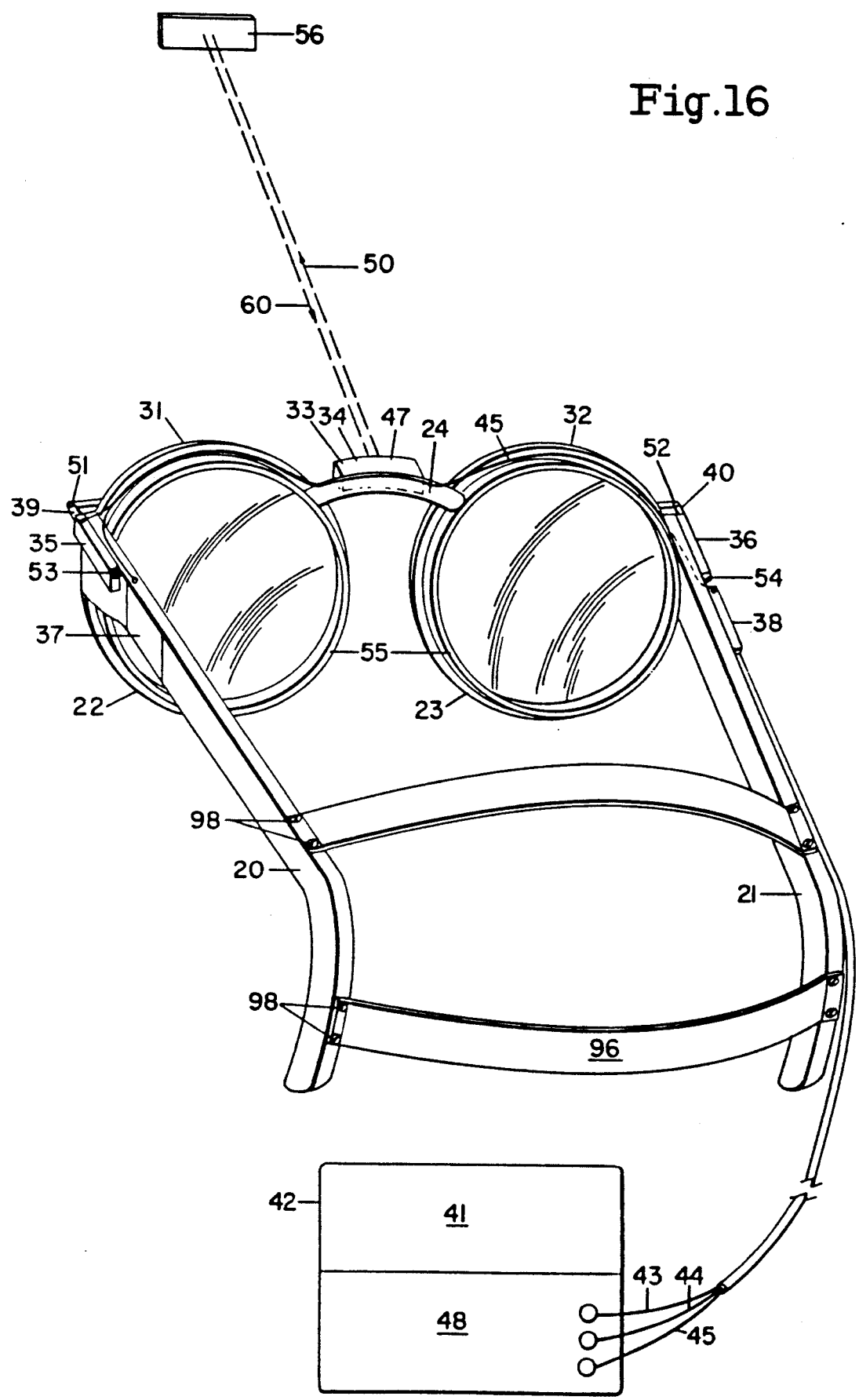
FIG. 16 shows automatic fast focusing eyeglasses, with the Lens Units 31 and 32 in frame 24. The Lens Units are automatically adjusted by Proportional Solenoids 35 and 36, respectively. Radar sending and receiving unit 33 with Monastatic antenna 47 facing straight out is mounted on top center in front of eyeglass frame 24 to supply sending signal 50 for distance, receiving signal 60 from object 56 is then fed into Micro Chip circuits, then into Electronic Converter 48 through harness 45. Electronic Converter 48 then supplies controlling current signal to power supply 37 or power supplies 37 and 38 through harnesses 43 and 44 if two power supplies are used for some special applications.
Figure 17:
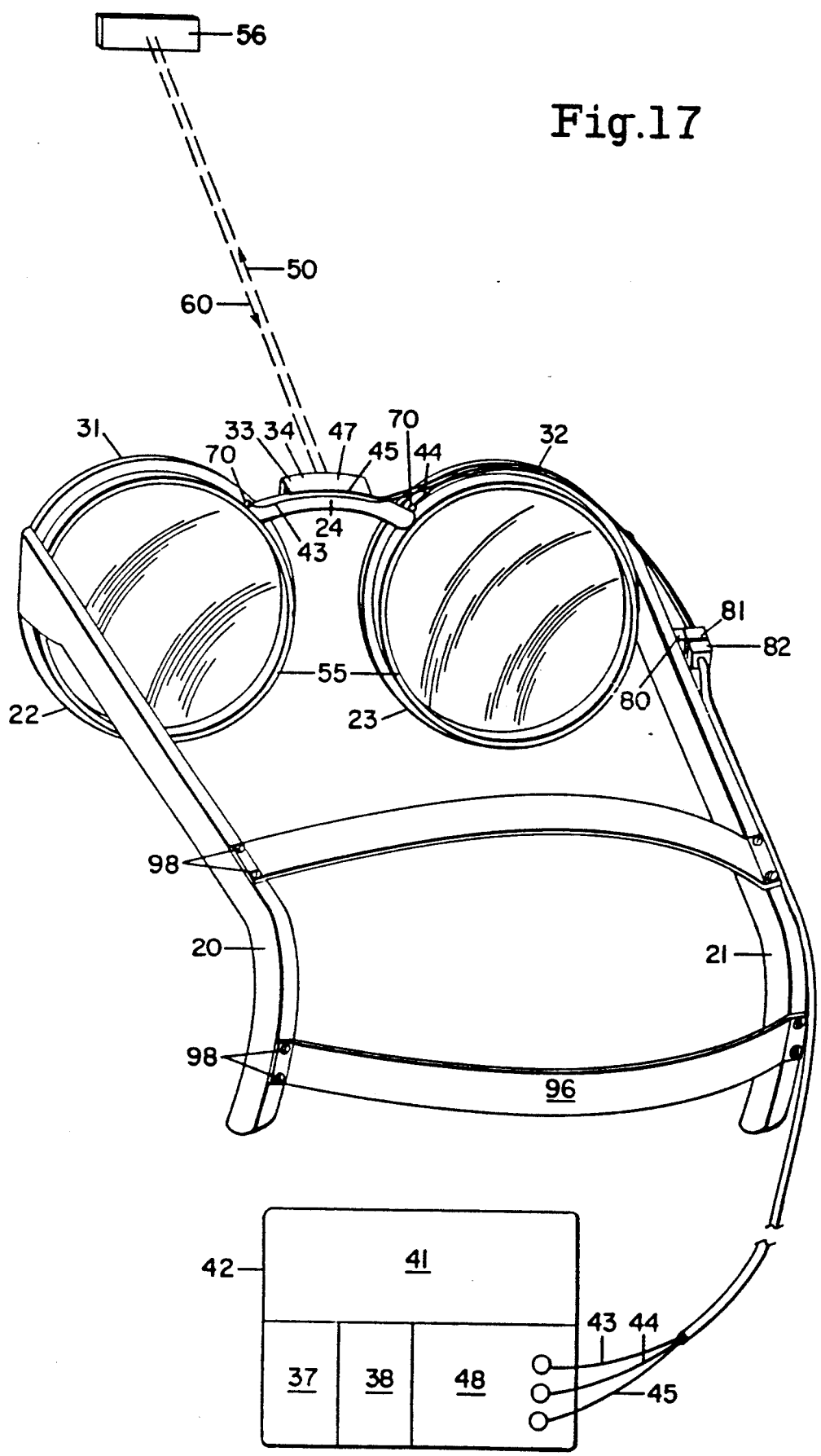
FIG. 17 shows automatic fast focusing eyeglasses, with the Lens Units 31 and 32 in frame 24. The Lens Units are automatically adjusted by Hollow Proportional Solenoids 35 and 36, respectively. Radar sending and receiving unit 33 facing straight out is mounted on top center in front of eyeglass frame 24.

Shown in FIGS. 1-14 a flange 55 is integrally molded to the surface 7 of Lens 2 inside of C-Ring reservoir 5 bore adjacent to connection 14 for Lens Units in FIGS. 1-14. The flanges 55 and 55 extending rearward into frame housings 22 and 23 respectively. These Lens Units 31 and 32 are now part of the eyeglass frame 24 in FIGS. 15 and 16. The reservoirs 5 and 5 on Lens Units 31 and 32 have clearance between their rearward outer surfaces 10 and 10 and eyeglass frame housings 22 and 23. The flanges 55 and 55 of Lens Units 31 and 32 can be fastened by Epoxy to the eyeglass frame housings 22 and 23. FIG. 13 shows a Lens Unit open supplying positive focal power by having a specially designed Hollow Proportional Solenoid 35 or 36 mounted in between lenses 1 and 2, and is centered and fastened to stabilizer ring 19 of lens 1 and inner surface 9 of lens 2 by various industrial processes. The construction described for FIG. 13 is for the Lens Units 31 and 32 respectively that are used in eyeglass frame 24 of FIG. 17. The forward lens 1 is mounted under sliding joints 16 located around the periphery of lens 2. The sliding joints 16 are fastened to the stationery lens 2 by various industrial processes. It is free to move outwardly and evenly without distortion of the change in radii, created as the lens moves outwardly as shown in FIG. 13. The radius is equal around the entire circumference of surface 6 of lens 1. Lens 1 is centered by the C-Ring reservoir 5, that is mounted concentrically to lenses 1 and 2 as shown in FIGS. 7, 8, 13 and 14, and additionally for FIGS. 13 and 14 by the Hollow Proportional Solenoids 35 and 36 respectively to their axes of centerline in operation, as they expand and retract. The force to move the forward lens 1 outwardly comes from the Hollow Proportional Solenoids 35 and 36 mounted in between lenses 1 and 2 for Lens Units 31 and 32 respectively. Power comes from connection 70, where power from the power supply connects to. The movement of Lens 1 moves outwardly and evenly in the same centerline axis of Solenoids 35 and 36 as shown in FIG. 13. A clear lens radius stabilizer ring 19 is fastened to the center of Lens surface 8 so that when expansion from Solenoid plungers 39 and 40 respectively pushes outwardly for Lens Units 31 and 3 respectively, there is uniform distribution of force. Solenoid plungers 39 and 40 are connected respectively to radius stabilizer rings 19 and 19 respectively for Lens Units 31 and 32. The Proportional Solenoid of this Lens Unit in FIGS. 13 and 14 is hollow in the center so that vision can be seen through for this application without any interference. These Solenoids 35 and 36 are specially made for this purpose. There are fluid ports 71 and 72 located at the specially made Proportional Solenoids rear ends 73 and 73, and plunger ends 74 and 74 of plungers 39 and 40 in connection areas to the stabilizer rings 19 and 19 to surfaces 9 and 9 respectively, to allow fluid to flow throughout the entire Lens Unit unobstructed with these hollow Solenoids in the Lens Units. The rear ends 73 and 73 of these Proportional Solenoids 35 and 36 are fastened to surfaces 9 and 9 with plungers 39 and 40 connected respectively to stabilizer rings 19 and 19 respectively of Lens Units 31 and 32 respectively. Retraction of lenses is by Solenoid return of plungers and by slight resilience of flexible lens material. The Lens Units shown in FIGS. 13 and 14 are for positive focal power. FIG. 14 shows the positive focal power Lens Unit of FIG. 13 closed supplying no focal power. For negative focal power FIG. 13 can be used by reversing the operation of the Hollow Proportional Solenoids 35 and 36 to pull in, instead of pushing out, and by reverse mounting of the sliding joints 16 fastened to flange 55, with lens 1 fastened to flange extension in C-Ring reservoir 5. Now along with the flexible lens being mounted on the rear designated as lens 2 instead of the outward position designated as lens 1 of the Lens Unit in FIG. 13, the lens 2 will be moved toward front on center line axis by the Hollow Proportional Solenoids 35 and 36 respectively, decreasing radius on surface 7 with radius on surface 6 now being larger with respect to surface 7. This will supply negative focal power for the FIG. 13 closed and no negative focal power for FIG. 13 when open. FIG. 15 is for eye measurement and has adjustment knobs 25 and 26 which extend gear rack extensions 27 and 28 to adjust Lens Units 31 and 32 by turning knobs 25 and 26 with dials 59 and 62 attached respectively. Corresponding pointers 29 and 30 give readout on knob dial scales 59 and 62, e.g., 0–100, for the eye focal power correction in Diopters etc. Nos. 27 and 28 are the gear rack extensions connected to 51 and 52 that are fastened to lenses 1 and 1 of the Lens Units 31 and 32 for the lenses shown in FIGS. 1-14. Nos. 20 and 21 go over the ears for wearing by individuals. Nos. 22 and 23 are the frame housings for the flanges 55 and 55 of the Lens Units. In FIG. 16, nos. 35 and 36 are the Proportional Solenoids that are mounted into the ear extensions 20 and 21 of frame 24 with power supplies 37 and 38 feeding power to them (current controlled power supplies, etc.), that can also be mounted into the ear extensions 20 and 21 of frame 24 to achieve a more compact product. No. 96 is an optional headband to relieve any excess pressure on bridge of the individual's nose due to the weight of radar unit 33. The headband is detachable if so desired, from fittings 98. Nos. 39 and 40 are the plunger extensions to 51 and 52 to the lenses 1 for FIGS. 1-12. In assembly Solenoid pivots 51 and 52 are connected to outer top left and top right surfaces 6 and 6 of Lenses 1 and 1 respectively to form Lense Units 31 and 32 respectively. No. 33 is the Radar sending unit with 50 being the beam sent out and beam 60 returning from object 56 to measure the distance. FIG. 17 uses the same electrical circuitry and the same eyeglass frame 24 used in FIG. 16, with basically the same construction except that the Lens Unit previously described for FIG. 13 are used for Lens Units 31 and 32 respectively, and the side mounted Proportional Solenoids 35 and 36 are now mounted in between the lenses and are now called Hollow Proportional Solenoids 35 and 36 respectively, for FIG. 17. The power supplies 37 and 38 are missing from frame 24 and the two power supplies 37 and 38 are mounted in case 42 to supply power to the Hollow Proportional Solenoids 35 and 36, for a more compact eyeglass product. No. 80 is the mounting base mounted to either 20 or 21 of eyeglass frame 24 for female receptacle 81 that connects to plug 82 used to separate the wire harnesses 43, 44 and 45.

The Radar sending and Radar receiving unit 33 is combined together for use in this invention. The sending and receiving Monastatic antenna 47 is covered with a protective cover called a Radome 34. There are various bands of frequency operation in Giga Hertz. An RF amplifier with Micro Chip circuitry is connected to increase the radio frequency output signal 50 for distant objects. This amplifier is coupled to Radar unit 33 on eyeglass frame 24 to comprise one unit 33. The signal 50 sent out hits the object 56 and return signal 60 is received by the receiver, then fed into the Analog Micro Chip circuitry that down converts high RF to low RF and then to Sampler Converter Micro Chip circuitry. The Sampler converts the radio frequency to voltage. Then the voltage is fed into a Closed Loop Circuit using Micro Chip circuitry with Range Gating to give an accurate measure of distance when the transmitted signal 50 hits an object 56 at various angles along with a straight ahead angle of 90°. The resulting output voltage is proportional to the distance that has been measured. The Radar unit 33 is powered by current from battery 41 in case 42 through harness 45 which also carries the output voltage to an Electronic Converter 48. The Electronic Converter 48 then sends a controlling signal voltage to the Current controlled power supply 37. With the output current of the power supply 37 varying in proportion to the distance which has been measured by the Radar unit 33, this controlled output from 37 is connected to Proportional Solenoids 35 and 36 and no varies the Proportional Solenoids 35 and 36 equally and proportionally respectively. This is from a starting point with plungers 39 and 40 of Solenoids 35 and 36 either retracted or extended. With the output plungers 39 and 40 connected to the pivots 51 and 52 the Lenses 1 and 1 of Lens Units 31 and 32 will vary equally and proportionally as well as giving the correct variable focal power for the varying distances. The results in automatic focusing for the eyeglasses.

No. 42 is the case for battery and Converter, 48, wire harness 45 for sending unit 33. Power supply 37 to wire harness 43. Harness 43 also supplies power to the Proportional Solenoids 35 and 36. Power supply 38 to wire harness 44. Harness 44 can also supply power separately to Solenoid 36 if used independently of each other for special applications. Two power supplies are shown, but one is sufficient for normal use. An Electronic Converter 48 is mounted in case 42 that also houses the battery 41. The signal comes from Radar sending and receiving Unit 33 and then is sent to an Electronic Converter 48 inside case 42, and then the output controls the power supply 37 (can supply both Proportional Solenoids) to supply current to both Proportional Solenoids 35 and 36. Power supplies can be either a Current controlled power supply or a battery back power supply. The Current controlled power supply maintains voltage and varies the Current enabling the Proportional Solenoids to move in precise amounts of travel. Battery 41 is a portable battery in case 42 supplying power for the Radar sending and receiving unit 33, the Electronic Converter 48 and the Current controlled power supply, which in turn powers the Proportional Solenoids 35 and 36.

The lenses in FIGS. 1-14 are coated with an anti-fog compound called "Vacuum Film Deposition" to stop fogging up of the outer surfaces 6 and 7 of the lenses 1 and 2, and to give better usefulness for all environments. The lenses can also be coated with other coatings to improve abrasion resistance and minimize reflection and glare if desired without affecting focal power. In normal operation the Lens Units shown in FIGS. 1 14 are mounted in frame housing 22 for Lens Unit 31 and frame housing 23 for Lens Unit 32 respectively of eyeglass frame 24 as shown in FIGS. 16 and 17, with the Lens Units designated as 31 and 32. The Lens Units shown in FIGS. 1-14 show different operating characteristics where the Proportional Solenoids 35 and 36 can be adapted for the operating features of the Lens Units for different design requirements with the eyeglass frames 24 in FIGS. 16 and 17. When the eyeglass frame is worn in FIG. 15, the individual's eyes can be checked giving a very accurate reading showing either the positive or negative amount of Focal Power by an optometrist as the patient adjusts the control knobs 25 and 26 with a gear 57 and 57 on the control knob shafts 58 and 58 moving gear rack extensions 27 and 28 while pointers 29 and 30 show the reading on the knob dial scales 59 and 62. The optometrist will select the charts and distance and the patient adjusts the knobs 25 and 26 for the best focus. The optometrist can adjust the automatic fast focusing eyeglass Lens Units 31 and 32 in frame housings 22 and 23 of frame 24 in FIG. 16 for the patient. Now with the individual wearing the automatic focusing eyeglasses shown in FIGS. 16 and 17, all the individual has to do is just look at an object straight ahead near or far and the Lens Units 31 and 32 in frame housings 22 and 23 of frame 24 will focus together so the object can be seen clearly and distinctly. When the individual looks directly straight ahead at an object or road ahead, a beam 50 is sent out from the Radar sending and receiving unit 33 mounted on eyeglass frame 24 in outer top center front after which a beam 60 is sent back from object 56 generating a signal value in relationship to the distance proportionally. The frequency of the Radar Unit 33 is different from other standard Radar in use e.g., navigation, police etc. The signal is fed into Electronic Converter 48 which in turn controls the Current controlled power supply 37 (power from the battery 41 is fed into power supply 37) or similar power supply, thereby supplying a specific amount current to the Proportional Solenoids 35 and 36 supplying equal amounts of travel for plunger stroke shafts 39 and 40, each of which is connected to Lens Units 31 and 32, respectively. For FIG. 16 plungers 39 and 40 are attached on pivot joints 51 and 52 to the forward movable lens. For FIG. 16 the opposite ends of the Proportional Solenoids 35 and 36 are attached on pivots 53 and 54 to the frame.

This amount of plunger travel from the Proportional Solenoids 35 and 36 will now automatically focus the Lens Units 31 and 32 for the object aimed at straight ahead by the eyeglass frame 24. Case 42 holds a battery 41 which supplies the power for the components, 33, 35, 36, 37, 38, and 48 and any other electrical parts associated with components 33, 35, 36, 37, 38 and 48. The distance of an object sighted is directly related to the focal power required of the Lens Units 31 and 32 for the individual wearing the auto focusing eyeglasses. The auto focusing eyeglasses described in FIGS. 16 and 17 once adjusted for a given value of maximum focal power will be interchangeable with another patient requiring equal eyeglass focal power prescription. This is standardization of product. Case 42 can be carried in a pocket or in a pouch attached to a belt, etc. Wiring harness 43, 44, and 45 can be worn under a coat, etc. to achieve a more compact product battery 41 could be mounted on 20 of eyeglass frame 24 with Electronic Converter 48 mounted on 21 of eyeglass 24 using same wiring harnesses 43, 44 and 45 respectively, to give a completely portable auto focusing eyeglass product lens case 42.

Focal distance measurement is accomplished preferably by using a combined Radar-sending and receiving device. Other types of units, e.g., microwave, are also possible.

While I have herein shown and described one embodiment of the invention, and have suggested certain changes and modifications thereto, it will be apparent to those of ordinary skill in the art who have read this description that still further changes and modifications may be made therein without departing from the spirit and scope of the invention.

I claim:

1. A fast focusing infinitely variable focal power lens system adapted for use with eyeglasses comprising:

a frame;

a first lens and a second lens mounted adjacent each other in said frame, with said first lens being a forward lens closest to an object to be viewed and said second lens being a rearward lens further from said object to be viewed, each lens having an inner surface and an outer surface;

said first lens and said second lens inner surfaces mounted in juxtaposed relationship with a space formed between said lenses' inner surfaces;

means connecting said first lens and said second lens so that said lenses' inner surfaces can be moved away from each other to increase and toward each other to decrease said space between said lenses' inner surfaces;

a reservoir around the perimeter of the first and the second lenses' edges in fluid communication with the space between said lenses' inner surfaces;

a transparent liquid located in said reservoir and filling said space between said lenses' inner surfaces;

a focusing means for moving said first and said second lenses relative to one another to adjust said space between said lenses' inner surfaces;

said reservoir fluid communication extending around most of the extent of said perimeter for providing a rapid response time for said fluid entering and exiting said space between said first and said second lenses.

2. A fast focusing infinitely variable focal power lens system adapted for use with eyeglasses as described in claim 1 wherein:

said focusing means includes an electrically actuated proportional solenoid and a power source in communication with said electrically actuated proportional solenoid.

3. A fast focusing infinitely variable focal power lens system adapted for use with eyeglasses as described in claim 1 wherein:

said focusing means for moving said first and said second lenses relative to one another includes a signal-sending unit and a signal-receiving unit for determining the distance between said lens system and said object to be viewed and means for communicating said distance to said focusing means.

4. A fast focusing infinitely variable focal power lens system adapted for use with eyeglasses as described in claim 1 wherein:

said reservoir contains helium gas in addition to said transparent liquid for decreasing response time.

5. A fast focusing infinitely variable focal power lens system adapted for use with eyeglasses as described in claim 1 wherein:

said reservoir and said reservoir fluid communication extend around the entire perimeter of said first and said second lenses edges.

6. A fast focusing infinitely variable focal power lens system adapted for use with eyeglasses as described in claim 1 wherein:

said outer surfaces of both said first lens and said second lens are coated with an anti-fog compound.

7. A fast focusing infinitely variable focal power lens system adapted for use with eyeglasses as described in claim 1 wherein:

said transparent liquid is a polydimethylsiloxane oil.

8. A fast focusing infinitely variable focal power lens system adapted for use with eyeglasses as described in claim 1 wherein:

said first forward lens' outer surface has a radius of curvature that is convex and said first forward lens' inner surface has a radius of curvature that is concave, and said radius of curvature of said first forward lens is moved toward said second rearward lens, and decrease as said first forward lens is moved away from said second rearward lens.

9. A fast focusing infinitely variable focal power lens system adapted for use with eyeglasses as described in claim 8 wherein:

said first forward lens is flexible and said second rearward lens is rigid.

10. A fast focusing infinitely variable focal power lens system adapted for use with eyeglasses as described in claim 1 wherein:

said focusing means for moving said first lens and said second lens relative to one another include means mounted on said frame for manually adjusting said space between said first lens and said second lens inner surfaces so that a wearer can adjust said lens system to suit their own eye requirements.

11. A fast focusing infinitely variable focal power lens system adapted for use with eyeglasses as described in claim 10 wherein:

said frame is provided with a display so as to determine the manually adjusted focal power and eyeglass prescription needed by said wearer.

12. A fast focusing lens system comprising:

a first lens and a second lens mounted adjacent each other with said first lens being a forward lens, closest to an object to be viewed, and said second lens being a rearward lens, further from said object to be viewed than said first lens;

each of said first lens and said second lens having an inner surface and an outer surface;

said first lens and said second lens inner surfaces mounted in juxtaposed relationship to each other with a space formed between said inner surfaces;

means connecting said first and said second lenses and allowing relative movement therebetween so that said space formed between said first and said second lenses inner surfaces can be adjusted;

a proportional solenoid for moving said first and said second lenses relative to one another to adjust the focal power of said lenses;

electrical means for operating said proportional solenoid.

13. A focusing lens system as described in claim 12 wherein:

said proportional solenoid has a hollow bore and a plunger with said plunger having an extension attached to one of said first lens or said second lens and said hollow bore attached to the other of said first lens or said second lens for moving said first and said second lenses relative to one another.

14. A focusing lens system as described in claim 13 wherein:

said electrical means for operating said proportional solenoid includes a focusing means;

said focusing means includes a signal sending device and a signal receiving device for determining the distance between said lens system and said object to be viewed.

15. A focusing lens system as described in claim 36 wherein:

a fluid reservoir is in fluid communication with said space between said first and said second lenses' inner surfaces;

said fluid reservoir extends around the periphery of one first and the second lenses' peripheral edges and said fluid communication between said fluid reservoir and said space between said first and said second lenses' inner surfaces extends around most of the extent of said periphery of said first and said second lenses'-edges;

a transparent fluid is in said reservoir and fills said space between said first and said second lenses' inner surfaces.

16. A focusing lens system as described in claim 12 wherein:

said first lens is flexible and said inner surface of said first lens has a series of channels therein for providing a uniform change in radius during movement of said first lens.

17. A focusing lens system as described in claim 12 wherein:

said proportional solenoid includes a hollow bore and a plunger;

said proportional solenoid plunger is attached to a clear stabilizer;

said proportional solenoid is attached to said first lens and said second lens with said proportional solenoid hollow bore attached to one of said first lens or said second lens and said proportional solenoid plunger is attached to the other of said first lens or said second lens by said clear stabilizer for adjusting said space between said first lens and said second lens inner surfaces.

18. A fast focusing lens system comprising:

a frame;

a first lens and a second lens mounted adjacent each other in said frame with said first lens being a forward lens, closest to an object to be viewed, and said second lens being a rearward lens, further from said object to be viewed, each lens having an inner surface and an outer surface;

said first lens and said second lens inner surfaces mounted in juxtaposed relationship with a space formed between said inner lens surfaces;

means connecting said first lens and said second lens so that said inner lens surfaces can be moved away from and toward each other to increase and decrease said space between said lenses' inner surfaces;

means for moving said first lens and said second lens toward and away from each other so as to vary the space between said first and said second lenses inner surfaces;

said means for moving said first lens and said second lens relative to one another including a radar sending and receiving unit mounted on said frame;

an electric circuit including an amplifier and converter controlled by said radar sending and receiving unit to provide the power to move said first lens and said second lens relative to each other to focus said lenses on said object.

19. A focusing lens system as described in claim 18 wherein:

said means for moving said first lens and said second lens includes a proportional solenoid for controlling the space between said first lens and said second lens in response to current flow controlled by signals received by said radar sending and receiving unit.

20. A focusing lens system as described in claim 19 wherein:

a fluid reservoir is in fluid communication with said space between said first and said second lenses' inner surfaces;

said fluid reservoir extends around the periphery of the first and the second lenses' edges and said fluid communication between said fluid reservoir and said space between said first and said second lenses' inner surfaces extends around most of the extent of said periphery of said first and said second lenses' edges;

a transparent fluid is in said reservoir and fills said space between said first and said second lenses' inner surfaces.

21. A fast focusing lens system comprising:

a first lens and a second lens mounted adjacent each other with said first lens being a forward lens, closest to an object to be viewed, and said second lens being a rearward lens, further from said object to be viewed than said first lens;

each of said first lens and said second lens having an inner surface and an outer surface;

said first lens and said second lens inner surfaces mounted in juxtaposed relationship to each other with a space formed between said inner surfaces;

means connecting said first and said second lenses and allowing relative movement therebetween so that said space formed between said first and said second lenses' inner surfaces can be adjusted;

said first lens being flexible and said inner surface of said first lens having a series of channels therein for providing a uniform change in radius during movement of said first lens.

22. A focusing lens system as described in claim 21 wherein:

a transparent liquid fills said space between said first lens and said second lens inner surfaces; and a focusing means for moving said forward lens relative to said second rearward lens adjusts the focal power of said lens system.

23. A focusing lens system as described in claim 22 wherein:

said transparent liquid has an index of refraction that is the same as that of said first lens.

24. A focusing lens system as described in claim 22 wherein:

a reservoir extends around the perimeter of the first and the second lenses' edges in fluid communication with said space between said first and said second lenses' inner surfaces.

25. A fast focusing infinitely variable focal power lens system adapted for use with eyeglasses comprising:

a frame;

a first lens and a second lens mounted adjacent each other in said frame, with said first lens being a forward lens closest to an object to be viewed and said second lens being a rearward lens further from said object to be viewed, each lens having an inner surface and an outer surface;

said first lens and said second lens inner surfaces mounted in juxtaposed relationship with a space formed between said lenses' inner surfaces;

means connecting said first lens and said second lens so that said lenses' inner surfaces can be moved away from each other to increase and toward each other to decrease said space between said lenses' inner surfaces;

a reservoir around the perimeter of the first and the second lenses' edges in fluid communication with the space between said lenses' inner surfaces;

a transparent liquid located in said reservoir and filling said space between said lenses' inner surfaces;

a focusing means for moving said first and said second lenses relative to one another to adjust said space between said lenses' inner surfaces;

said reservoir having a quantity of Helium gas under a slight pressure to assist movement of said transparent liquid.

26. A fast focusing infinitely variable focal power lens system adapted for use with eyeglasses as described in claim 25 wherein:

said reservoir is a hollow thin-walled elastomeric C-shaped ring.

27. A fast focusing infinitely variable focal power lens system adapted for use with eyeglasses comprising:

a frame;

a first lens and a second lens mounted adjacent each other in said frame, with said first lens being a forward lens closest to an object to be viewed and said second lens being a rearward lens further from said object to be viewed, each lens having an inner surface and an outer surface;

said first lens and said second lens inner surfaces mounted in juxtaposed relationship with a space formed between said lenses' inner surfaces;

means connecting said first lens and said second lens so that said lenses' inner surfaces can be moved away from each other to increase and toward each other to decrease said space between said lenses' inner surfaces;

a reservoir around the perimeter of the first and the second lenses' edges in fluid communication with the space between said lenses' inner surfaces;

a transparent polydimethylsiloxane polymer oil located in said reservoir and filling said space between said lenses' inner surfaces;

a focusing means for moving said first and said second lenses relative to one another to adjust said space between said lenses' inner surfaces.

28. A fast focusing infinitely variable focal power lens system adapted for use with eyeglasses as described in claim 27 wherein:

said reservoir has a quantity of helium gas under a slight pressure to assist movement of said transparent oil.

29. A fast focusing infinitely variable focal power lens system adapted for use with eyeglasses as described in claim 27 wherein:

said reservoir is a hollow thin-walled elastomeric C-shaped ring.

* * * * *